United States Patent
Bailey

[11] 3,923,313
[45] Dec. 2, 1975

[54] SELF-ADJUSTING GREASE-SEALED ARTICULAR JOINT

[75] Inventor: Leonard B. Bailey, Palestine, Ill.

[73] Assignee: J. I. Case Company, Racine, Wis.

[22] Filed: May 22, 1975

[21] Appl. No.: 579,798

[52] U.S. Cl. .................................. 277/63; 277/83
[51] Int. Cl.² ........................................ F16J 15/34
[58] Field of Search ............... 277/63, 81, 83, 237

[56] References Cited
UNITED STATES PATENTS

| | | | |
|---|---|---|---|
| 2,173,075 | 9/1939 | Nelson | 277/83 |
| 2,743,948 | 5/1956 | Heinrich | 277/83 |
| 3,044,787 | 7/1962 | Derman | 277/83 |
| 3,075,781 | 1/1963 | Atkinson et al. | 277/83 |
| 3,499,653 | 3/1970 | Gardner | 277/63 |
| 3,504,917 | 4/1970 | Malmstrom | 277/63 |
| 3,582,090 | 6/1971 | Lott | 277/63 |
| 3,703,296 | 11/1972 | Malmstrom | 277/63 |
| 3,765,689 | 10/1973 | Adams | 277/81 R |

*Primary Examiner*—Robert I. Smith
*Attorney, Agent, or Firm*—Arthur J. Hansmann

[57] ABSTRACT

A self-adjusting grease-sealed articular joint including a pin and two members encircling the pin and piloted thereon. One of the members has a circular boss on which an elastomeric ring is disposed and is stretched thereover to deflect to a shape which causes the ring to be snug with the boss and to extend to the other of the members to be snug therewith, and thereby present a self-adjusting grease seal between the two members.

6 Claims, 3 Drawing Figures

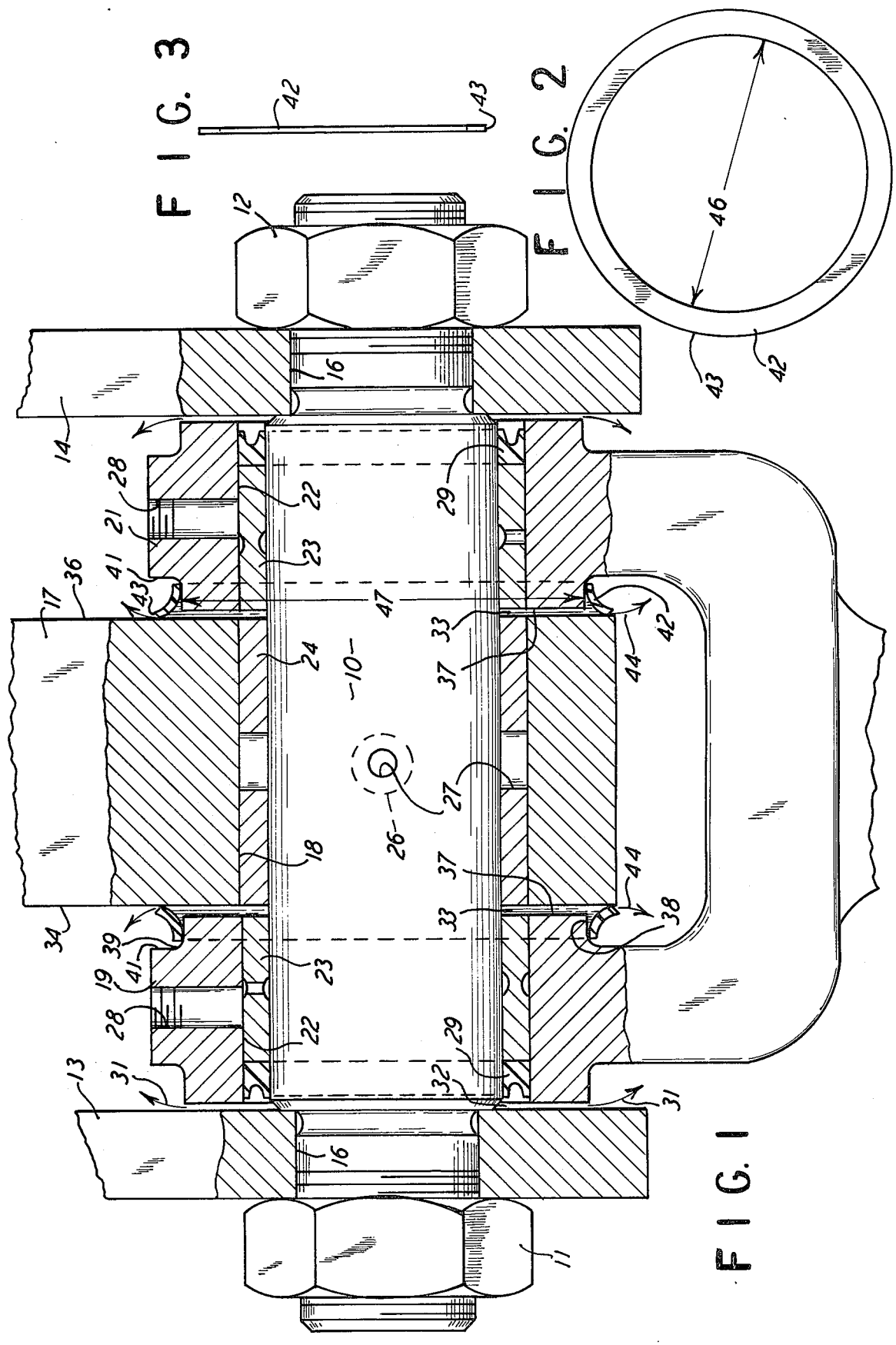

SELF-ADJUSTING GREASE-SEALED ARTICULAR JOINT

This invention relates to a self-adjusting grease-sealed articular joint, and, more particularly, it relates to a pin-type joint which has members pivotally mounted on the pin and having provisions for greasing the members, and with a grease seal effective on the members for retaining the grease thereon.

BACKGROUND OF THE INVENTION

The prior art is repleat with instances of the provision of articular joints utilizing pins for piloting members which are connected together by the pin and are rotatable relative to the pin and to each other. That is, common linkages have that general characteristic, and it is commonly found in the art of pinning two members or links together for purposes of articularly mounting implements on links, such as buckets mounted on material handling tractors or the like. Further, the prior art is aware of utilizing ring-shaped members for forming grease seals between two movable parts of an articular joint, such as that shown in U.S. Pat. 3,291,494, and Pat. 3,250,540 shows a ring-shaped or angular type of seal member also.

However, the prior art arrangements of a grease-sealed articular joints are commonly not a self-adjusting and reliable and inexpensive type of joint, and, accordingly, it is a primary object of this invention to make those improvements upon the prior art articular joints. Therefore, the present invention provides an articular type of joint which is both a somewhat adjustable joint and an adjustable self-sealing type of joint. In accomplishing this objective, the joint of the present invention permits the desired tolerance and axial movement between members which are pinned together, and it simultaneously provides a self-adjusting grease seal operative between the adjustable members, as mentioned.

Still further, the present invention provides for a self-adjusting grease-sealed articular joint which is readily and easily provided and which is self-adjusting, both for the grease-sealing function and for adjusting for wear and various tolerances between the parts, as well as for the wear and tolerance of the seal itself.

Still further, it is an object of this invention to provide a self-adjusting grease-sealed articular joint wherein the seals utilize rings which can be made of desirably different inner and outer diameter sizes to accomodate the relationship between two members which are included in the joint and which are relatively movable axially of the sealing rings. That is, the present invention permits the provision of a self-adjusting grease-sealed joint to accomodate the joint members themselves, simply by making the seal ring of an elastomeric material and of a size which accomodates the sizes of the two members which are incorporated in the joint itself. Thus no closely sized nor highly specialized type of seal ring is required, since the seal ring itself adjusts to the size of the members included in the joint and it also adjusts to the relative movement between the joint members.

Other objects and advantages will become apparent upon reading the following description in light of the accompanying drawings.

BRIEF DESCRIPTION OF THE DRAWINGS

FIG. 1 is a sectional view of a joint of this invention.
FIG. 2 is an axial view of the seal ring shown in FIG. 1, but being on a smaller scale.
FIG. 3 is an edge view of the seal ring shown in FIG. 2.

DETAILED DESCRIPTION OF THE PREFERRED EMBODIMENT

The drawings show a self-adjusting grease-sealed articular joint which has a pin ten extending from end to end between nuts 11 and 12 which are threaded onto the opposite ends of the pin ten, as shown. Link or support members 13 and 14 have openings 16 which receive the opposite end of the pin 10 and which therefore are piloted on and can give support to the pin 10, in the arrangement of a conventional type of pin joint. A first member 17 is also piloted relative to the pin 10 and it encircles the pin and has an opening 18 through which the pin 10 is extending, as shown. Also, two other members 19 and 21 are piloted relative to the pin 10 and they have openings 22 through which the pin 10 extends, as shown. The drawing further shows tubularly shaped bushing members 23 and 24 extending between the pin 10 and the members 19 and 17, respectively. Further, there is shown a grease opening 26 which extends through the member 17, on the far side thereof as viewed in FIG. 1, and the bushing 24 has openings 27 which can admit the grease and permit it to pass axially of the pin 10 and move to between the member 17 and 19 and 21, in a conventional arrangement of a pinned joint with the members as described herein. Also, the members 19 and 21 are shown to have grease passageways 28 which can also be used for injecting grease between the surfaces of the various members of the joint as described above and as is common and well known in the art. Grease seal and dirt seal members 29 are also shown on opposite ends of the pin 10 for precluding the entrance of dirt and precluding the exit of any substantial amount of grease beyond the members 29. However, some grease will flow from the interior of the joint, as shown by the arrows designated 31, all in a conventional arrangement of a joint.

Particularly unique properties of the present invention reside in the fact that the members 17 and 19 and 21 are all piloted on the pin 10 and are thus pivotable or rotatable about the longitudinal axis or the pin 10, and relative to the pin 10, and those members are also movable relative to each other to move toward and away from each other and along the axis of the pin 10, and thus the drawing shows the spaces 32 and 33 between the adjacent members described above.

The member 17 is shown to have two planar surfaces 34 and 36, and these surfaces are perpendicular to the longitudinal axis of the pin 10, and that is the pivot axis of the joint itself. Also, the members 19 and 21 have planar surfaces 37 which are shown spaced from the respective surfaces 34 and 36, in the relative axial positions of the members 19 and 21 relative to the number 17. The members 19 and 21 have circular bosses 38 which terminate in fillets 39 and circular planar surfaces or shoulders 41, as shown. Thus the joint presents parallel and spaced apart planar surfaces 41 and 34 and 36, as shown. An elastomeric grease seal ring 42 is disposed on each boss 38 and extends endlessly thereround and is shown concave in FIG. 1 and has its outer diameter or edge 43 in contact with the respective planar surfaces 34 and 36. The rings 42 are of a polyurethane material having a durometer A hardness of 97 and an elongation percent of 500 and thus the two rings 42 are elastic and are actually in a stretched condition as shown in FIG. 1. FIG. 2 shows the condition of the rings 42 in their free body position and prior to their mounting on the bosses 38 as shown in FIG. 1. Thus, the rings 42 are of a flat stock or shape and are annular and they are elastic, all as shown in the three views and as required to be capable of assuming the concave position shown in FIG. 1 when the rings are snugly stretched over the circular bosses 38. Thus, the rings 42 provide a grease seal between the members 17 and 19 and 21, and they thereby retard the flow of grease past the seal in the direction of the arrows 44, in the desired and the usual self-flushing flow of grease from a joint, and the rings thereby desirably retard the exit of grease but still permit the grease-flushing action of the joint. Also, the rings 42 can slide both axially of the bosses 38 and also along the surfaces 34 and 36, and it should also be noted that the inner and outer diameters of the rings 42 are such that the rings are trapped by the surfaces 41 and the surfaces 34 and 36 so that the rings will always be in position to function as described herein.

Thus, the rings 42 have an inner diameter designated 46, and that is slightly less than the diameter 47 of the bosses 38. Thus the rings are snug on the bosses 38 and are substantially grease flow tight therewith and the rings form the concave shape shown in FIG. 1, because of the smaller inner diameters 46. The ring outer diameter to the outer edge or circumference 43 is also sufficient to cause the edge 43 to be against the surfaces 34 and 36, respectively, even after relative movement of the members 17 and 19 and 21 along the axis of the joint, as mentioned. Still further, the size of the rings 42, and also the inner diameter and the outer diameter of the rings 42, can be readily and easily arranged to accomodate different spacings between the planar surfaces of the joint members, as described, and also the different sizes of the ring inner diameter 46 can determine the desired snugness with the bosses 38.

The joint is thus a self-adjusting grease-sealed joint which permits the desired flushing of grease through the joint but which also permits the relative axially movement of the parts along the axis of the joint, and the rings 42 accomodate such axial movement, even if the surfaces 36 and 37 came together to provide a wide space between the surfaces 34 and 37. Also, the overall area or extent of the surfaces 34 and 36 is such that it is beyond the outer edge or curcumference 43 of the respective ring 42, to thereby trap and control the ring 42.

What is claimed is:
1. A self-adjusting grease-sealed articular joint comprising a pin establishing an axis of articulation of the joint, two members encircling said pin and being relatively movable toward and away from each other in the direction of the axis of said pin, one of said members having a circular boss disposed adjacent the other of said members and with said other of said members having a planar surface facing said boss and being of a size larger than the diameter of said boss, said one member also having a planar surface continguous with and disposed to the side of said boss spaced from the first said planar surface, and an elastomeric grease-seal ring of an annular shape disposed on said boss and having an internal diameter less than the diameter of said boss and stretched onto said boss and be deflected into a concave shape with the outer circumference of said ring disposed against the first said planar surface, and with said ring thereby disposed in the space between said planar surfaces and present a grease seal therebetween.

2. The self-adjusting grease-sealed articular joint as claimed in claim 1, wherein the outer diameter and flexibility of said ring are such that said ring extends from the first said planar surface to the limit of the extent of said boss away from the first said planar surface, to thereby have said ring present a grease seal between said surfaces.

3. The self-adjusting grease-sealed articular joint as claimed in claim 1, wherein the dimensional differences between the inner and outer diameters of said ring results in a cross-sectional size of said ring which is greater than the greatest space between said surfaces.

4. The self-adjusting grease-sealed articular joint as claimed in claim, 1, wherein the elastomeric characteristic of said ring is a urethane material having a 500 percent elongation and a durometer A hardness of 97.

5. The self-adjusting grease-sealed articular joint as claimed in claim 1, wherein there are two said bosses with one on each side of the other said member which has two said planar surfaces adjacent the respective said bosses, and two said rings disposed on the respective said bosses, and with said other member having a grease opening between its said planar surfaces for receiving grease which can flow to said rings.

6. The self-adjusting grease-sealed articular joint as claimed in claim 5, wherein said rings are free to be slidable on and axially of said bosses and are free to be slidable along said planar surfaces of said other member, for presenting the self-adjusting grease seal rings.

* * * * *